US012565970B2

(12) United States Patent
Sinault et al.

(10) Patent No.: US 12,565,970 B2
(45) Date of Patent: Mar. 3, 2026

(54) SAFETY DEVICE FOR A TANK INTENDED TO CONTAIN A PRESSURIZED GAS

(71) Applicant: PLASTIC OMNIUM NEW ENERGIES FRANCE, Lyons (FR)

(72) Inventors: Yann Sinault, Brussels (BE); Christian Bopwa Muntu, Brussels (BE); Claude Mesjasz, Brussels (BE)

(73) Assignee: PLASTIC OMNIUM NEW ENERGIES FRANCE, Lyons (FR)

( * ) Notice: Subject to any disclaimer, the term of this patent is extended or adjusted under 35 U.S.C. 154(b) by 0 days.

(21) Appl. No.: 18/850,195

(22) PCT Filed: Mar. 30, 2023

(86) PCT No.: PCT/EP2023/058279
§ 371 (c)(1),
(2) Date: Feb. 24, 2025

(87) PCT Pub. No.: WO2023/187048
PCT Pub. Date: Oct. 5, 2023

(65) Prior Publication Data
US 2025/0180171 A1 Jun. 5, 2025

(30) Foreign Application Priority Data
Apr. 1, 2022 (FR) ...................................... 2202988

(51) Int. Cl.
*F17C 13/12* (2006.01)

(52) U.S. Cl.
CPC ........ *F17C 13/123* (2013.01); *F17C 2209/23* (2013.01); *F17C 2221/012* (2013.01); *F17C 2223/036* (2013.01); *F17C 2260/042* (2013.01)

(58) Field of Classification Search
CPC ............ F17C 13/123; F17C 2205/0332; F16K 17/383; Y10T 137/1804
See application file for complete search history.

(56) References Cited

U.S. PATENT DOCUMENTS

| | | | |
|---|---|---|---|
| 6,382,232 | B1 | 5/2002 | Portmann |
| 2021/0172540 | A1 | 6/2021 | Morgan et al. |

FOREIGN PATENT DOCUMENTS

| | | | |
|---|---|---|---|
| DE | 10 2011 114 724 | A1 | 4/2013 |
| DE | 10 2018 211 984 | A1 | 1/2020 |

OTHER PUBLICATIONS

DE102018211964A1_English_Machine_Translation (Year: 2018).*
International Search Report issued Jun. 21, 2023 in PCT/EP2023/058279, filed on Mar. 30, 2023, 2 pages.

* cited by examiner

*Primary Examiner* — Reinaldo Sanchez-Medina
*Assistant Examiner* — Nicole Gardner
(74) *Attorney, Agent, or Firm* — Oblon, McClelland, Maier & Neustadt, L.L.P.

(57) ABSTRACT

A safety device includes a ventilation channel to establish fluid communication between an Internal volume defined by a tank and the outside of the tank; a first safety member which is deformable and that keeps a safety piston in the closure position against an elastic force returning the safety piston to the safety position, structure for deforming the first safety member, and a second safety member intended, in a resting position, to hold the deformation structure in the resting position against an elastic force returning the deformation structure back to the deformation position when the second safety member experiences a temperature lower than a predetermined temperature and, in a working position, to release the elastic force for returning the deformation structure in the deformation position when the second safety member experiences a temperature higher than the predetermined temperature.

13 Claims, 2 Drawing Sheets

SAFETY DEVICE FOR A TANK INTENDED TO CONTAIN A PRESSURIZED GAS

TECHNICAL FIELD OF THE INVENTION

The invention relates to a safety device for a tank intended to contain a pressurized gas and to a method of manufacturing such a safety device. The invention also relates to a kit for manufacturing such a safety device. The invention also relates to a tank intended to contain a pressurized gas equipped with the safety device according to the invention and to a motor vehicle equipped with such a tank.

BACKGROUND ART

Tanks intended to contain a pressurized gas are known in the prior art. These tanks are, for example, intended to store compressed dihydrogen for use on a vehicle as a fuel tank. These tanks are generally equipped with a safety valve intended for fluidly connecting the inside of the tank with the outside of the tank when the pressure inside the tank is too high in order to release the gas stored in the tank to the outside and thus reduce the risk of the tank exploding. Among the safety valves used, heat-sensitive valves, commonly known as Thermal Pressure Relief Devices (TPRDs) are notably known. When a tank experiences high temperatures, for example when a flame is in the vicinity thereof, the pressure inside the tank increases to a point where there is a risk of explosion. Thermal pressure relief devices are therefore particularly useful for preventing heat-induced pressure increases inside the tank.

Thermal pressure relief devices generally comprise a safety member, this safety member keeping a piston for closing a ventilation channel of the tank in a closing position of the channel. When a heat source is in the vicinity of the safety member, said safety member melts or bursts and no longer holds the blocking piston in the position wherein it closes the ventilation channel. Return means, for example a spring, then displace the closing piston so that it no longer closes the ventilation channel, thus fluidly connecting the inside and outside of the tank and causing the gas stored in the tank to escape to the outside, thus preventing an increase in pressure inside the tank. However, such thermal pressure relief devices can only detect a heat source within a relatively close radius of the safety member. Thus, if the heat source is far away from the thermal pressure relief device, which is very likely for large tanks, the temperature of the safety member is not high enough for it to melt or burst. As a result, the pressure inside the tank may rise and create a risk of explosion. One solution to overcome this problem has been to increase the number of thermal pressure relief devices fitted to the tank to cover a larger surface area. However, this solution is cumbersome and uneconomical. Furthermore, increasing the number of thermal pressure relief devices fitted to a tank proportionally increases the number of interfaces to be sealed between the thermal pressure relief devices and the tank, which also increases the risk of gas leaks.

One solution was to use a fuse in contact with the safety member and extending away from the tank. When a heat source, such as a flame, is in the vicinity of the fuse, said fuse ignites and burns, propagating thermal energy up to the safety member in order for it to melt or burst. Such a thermal pressure relief device is described, for example, in document U.S. Pat. No. 6,382,232 B1. However, such devices have disadvantages in that the safety member does not always melt or burst once the fuse has been ignited. Indeed, firstly, the fuse may stop burning before it reaches the safety member. This is the case, for example, if the fuse is wet on at least a portion of its journey up to the safety member. Secondly, it is difficult to control the exposure time of the safety member to the thermal energy transmitted by the fuse. The combustion of the fuse may be too rapid to raise the temperature of the safety member sufficiently for it to melt or burst. Thus, the risk that the presence of a temperature source will cause an increase in pressure inside the tank that could lead to an explosion remains significant, despite the presence of the thermal pressure relief device.

Document DE 10 2011 114 724 A1 describes a safety device for a tank intended to contain a pressurized gas. The safety device comprises an ventilation channel intended to fluidly connect the inside and outside of the tank, a safety piston that is movable between a position wherein the ventilation channel is closed and a safety position, a frangible bulb holding the safety piston in the closure position, a screw that is movable between a resting position and a position wherein the bulb is destroyed and a Bowden type cable intended, in the resting position, to hold the screw in the resting position against an elastic force returning the screw to the bulb destruction position and, in a working position, to release the elastic force returning the screw back to the bulb destruction position.

SUMMARY OF THE INVENTION

One of the aims of the invention is notably to provide a safety device for a tank intended to contain a pressurized gas which is safer, particularly in the presence of a heat source.

To this end, the invention relates to a safety member for a tank intended to contain a pressurized gas, comprising:
- a ventilation channel intended to establish fluid communication between an internal volume defined by the tank and the outside of the tank,
- a safety piston movable between a closure position in which it closes the ventilation channel, and a safety position in which it does not close the ventilation channel,
- a first safety member which is deformable and configured to keep the safety piston in the closure position against an elastic force returning the safety piston in the safety position, the safety device further comprising:
- deformation means for deforming the first safety member, wherein the deformation means are movable between a resting position and a deformation of the first safety member position, and
- at least a second safety member intended, in a resting position, to hold the deformation means in the resting position against an elastic force returning the deformation means in the deformation of the first safety member position when the second safety member is subjected to a temperature below a predetermined temperature, and, in a working position, to release the elastic force for returning the deformation means in the deformation of the first safety member position when the second safety member is subjected to a temperature higher than the predetermined temperature,
- wherein the second safety member is formed by a safety cable made of a material having low mechanical resistance to fire.

Thus, when the second safety member experiences a temperature higher than the predetermined temperature, for example when a flame is in contact with or close to the second safety member, the deformation means move from their resting position to their deformation of the first safety member position and consequently deform the first safety member so that it no longer fulfills its function of keeping the safety piston in the closure position. As a result, the elastic force returning the safety piston in the safety position causes the safety piston to elastically return to the safety position, thus fluidly connecting the inside and outside of the tank, such that the gas contained in the tank escapes through the ventilation channel to the outside of the tank. In this way, a pressure increases inside the tank in the presence of a heat source having a temperature higher than the predetermined temperature is simply and economically avoided. It should be noted that it is the passage of the second safety member from its resting position to its working position that allows the safety device to be actuated, and that this does not require any thermal energy to be transmitted to the first safety member, which is advantageous. Additionally, the use of elastic return means to move the blocking piston towards its safety position and the deformation means towards their deformation of the first safety member position is advantageous in that it is simple to implement, robust and economical. The use of a second safety member as a sensor element is advantageous in that it eliminates the need for the first safety member to be positioned as close as possible to the heat source for the safety member to be activated.

"First safety member which is deformable" is understood to mean that the first safety member can be deformed by the action of the deformation means, for example by bending or destruction. The deformation is such as to prevent the first safety member from fulfilling its function of holding the safety piston in the closure position. When this function is no longer fulfilled, it is understood that the elastic force returning the safety piston back to the safety position is then used to move the safety piston into the safety position.

The predetermined temperature is selected, inter alia, according to the characteristics of the tank and/or the gas that the tank is intended to store. It is selected so that prolonged exposure of the tank to a temperature below the predetermined temperature, regardless of the duration of exposure, does not increase the pressure inside the tank to a level such that the risk of the tank exploding is high. In other words, it is selected so that prolonged exposure, that is, for several minutes, for example between five and sixty minutes, to a temperature higher than the predetermined temperature is sufficient to generate an increase in pressure inside the tank that significantly increases the risk of the tank exploding. The predetermined temperature, depending on the characteristics of the tank and/or the gas to be stored, is typically between 95° C. and 150° C., for example between 100° C. and 130° C., preferably between 100° C. and 120° C. The predetermined temperature is selected within this temperature range so as to be low enough to cause actuation of the safety device when necessary, that is, when there is a credible risk of the tank exploding, and high enough so as not to trigger the safety device, and therefore cause loss of the contents stored in the tank, when there is no serious risk of the tank exploding. This temperature range is typically used to detect the presence of a flame near the tank.

The mechanical resistance to fire of an element is the time during which, when exposed to fire, this element continues to perform its function. This thus means that the lower the mechanical resistance to fire of an element, the faster this element will cease to perform its function when exposed to fire. In the present case, this value reflects the time during which the second safety member maintains the deformation means in the resting position when it is exposed to a temperature higher than the predetermined temperature. As this time is short, it is understood that the element will cease to perform its function rapidly when exposed to a temperature higher than the predetermined temperature. This thus reduces the risk that, during the fire resistance period, the pressure inside the tank will rise, creating a risk of the tank exploding.

The use of a safety cable as a second safety member is a simple and cost-effective way of implementing the second safety member.

The invention may also comprise one or more of the following optional features, taken alone or in combination.

The first safety member is frangible. According to this embodiment, the deformation caused by the deformation means is advantageously a destruction of the first safety member. This destruction ensures, even more than a bending, that the first safety member can no longer fulfill its function of keeping the safety piston in the closure position. The safety device is thus more reliable. "Frangible safety member" is understood to mean a safety member designed to be easily destroyed by the deformation means when said deformation means move into the deformation position—which can also be referred to herein as the destruction position—of the first safety member.

The first safety member is formed of a glass bulb. This is a simple and cost-effective embodiment for the first safety member. A glass bulb is easily frangible with numerous different means of deformation that are also simple and cost-effective to implement.

In one embodiment, the glass bulb contains a fluid, the fluid being intended to exert pressure on the bulb when subjected to a temperature above the predetermined temperature so as to break the bulb. In this way, the bulb can both be broken by the deformation means when the second safety member experiences a temperature higher than the predetermined temperature and be broken when it, itself, experiences a temperature higher than the predetermined temperature. A double detection level of a risk is thus achieved for the safety of the tank since the second safety member thus detects a heat source located at a distance from the glass bulb and the glass bulb detects a heat source located in the vicinity thereof. The heat source detection zone covered by the safety device is therefore larger.

The first safety member is fusible when subjected to a temperature higher than the predetermined temperature. In this way, when the first safety member experiences a temperature higher than the predetermined temperature, it melts and can no longer perform its function of keeping the safety piston in the closure position. A double detection level of a risk is thus achieved for the safety of the tank since the second safety member thus detects a heat source located at a distance from the first safety member and the first fusible safety member detects a heat source located in the vicinity thereof. The heat source detection zone covered by the safety device is therefore larger.

The elastic force returning the deformation means in the deformation of the first safety member position is provided by a spring resting on a support seat having an opening configured to allow the passage of the second safety member. This is a simple, reliable and compact way of achieving the elastic force required to return the deformation means in the deformation of the first safety member position.

Preferably, at least part of the opening in the support seat of the spring is composed of and/or covered by lubrication means. The movements of the second safety member through the opening in the support seat are thus facilitated. This is particularly advantageous in that it reduces the risk of friction between the second safety member and the opening in the support seat slowing down the release of the elastic return force of the deformation means in the deformation of the first safety member position. If such a slowdown occurs, there is a risk that the deformation means will reach the first safety member with insufficient kinetic energy to allow deformation, for example destruction or bending, of the first safety member. In such a situation, it may not be possible to activate the safety device and therefore leads to a risk of the tank exploding. The lubrication means may be of any type compatible with the operation of the safety device. For example, the lubrication means may be solid, liquid or paste-like.

The safety piston has a housing configured to house at least part of the deformation means when the safety piston is in the safety position and the deformation means are in the deformation of the first safety member position. This thus reduces the risk of the deformation means being jammed in the deformation position of the first safety member, preventing the safety piston from moving into the safety position, which could lead to a risk of the tank exploding.

The deformation means comprise a striking element. A striking element is an element of the deformation means intended to come into contact with the first safety member in order to deform it, preferably by destroying it. It can thus take any form compatible with this function. For example, the striking element takes the form of a punch, bayonet, arrow or blade. Preferably, the striking element is a blade. This shape is advantageous in that it takes up little space and is effective in deforming, or even destroying, the first safety member. In particular, it is possible to note that a blade, while having a very reduced thickness, characteristic of a blade, may be large enough to cover an entire width of the first safety member. The blade further has the advantage of having a low drag coefficient, therefore it is not likely to slow down the displacement of the deformation means from their resting position to their position of deformation of the first safety member.

The second safety member comprises an elastic member. The second safety member is thus able to compensate for any variations in the size of the tank based on the filling rate thereof. For example, the second safety member comprises a rubber element. In accordance with the embodiments, the rubber may be natural or synthetic. In another example, the second safety member comprises a tension spring. In accordance with the embodiments, the tension spring may be a coiled round steel wire.

The length of the safety cable is between 1 m and 10 m, preferably between 1 m and 3 m. In this way, the safety cable is likely to cover a greater part of the length of a large tank. Thus, the cable is able to detect a heat source over a wider area, even for a large tank. Preferably, the length of the safety cable is selected so as to be able to extend over the entire length of the tank.

The safety cable is made of a material classified D according to the European standard EN 13501-1, or of a material classified M3 or M4 according to the French standard NF P92-507. It is understood that reference is made to these standards in their versions in force at the time of submission of the present application. Such materials have a low mechanical resistance to fire and, when subjected to a temperature higher than the predetermined temperature, ensure that the deformation means move from their resting position to their position of deformation of the first safety member and consequently deform the first safety member so that it no longer fulfills its function of keeping the safety piston in the closure position The safety cable is made from a material selected from the group consisting of rubbers, polyamides, wools, polyesters, high-density polyethylenes, preferably of high molecular weight, polypropylenes, and combinations thereof. These materials all have low mechanical resistance to fire and are simple and economical to use.

Preferably, the safety cable is made of polypropylene. A cable made of polypropylene is more rigid and less sensitive to creep, thermal aging and moisture than a safety cable made of a material selected from the list of materials mentioned above. The reliability of the safety device is thus improved.

The material used to make the safety cable may be a composite material loaded with fibers such as glass fibers, carbon fibers, graphite fibers, aramid fibers, basalt fibers, mineral fibers or equivalent. This load advantageously stabilizes the mechanical properties of the safety cable, thus ensuring the reliability of the safety cable over time so as to extend the service life of the safety device.

The material used to make the safety cable can also be covered with another material. Thus, other mechanical properties can be added to the safety cable. For example, a cable made of polyamide is more sensitive to moisture and this disadvantage can be reduced by covering the safety cable with a material that is less sensitive to moisture.

The safety cable is made of a material with a mechanical resistance to fire of between 10 seconds and 1 hour, preferably between 1 minute and 45 minutes, even more preferably between 10 minutes and 30 minutes. This value reflects the time during which the safety cable maintains the deformation means in the resting position when it is exposed to a temperature higher than the predetermined temperature. As this time is short, it is understood that the safety cable will cease to perform its function rapidly when exposed to a temperature higher than the predetermined temperature. This thus reduces the risk that, during the fire resistance period, the pressure inside the tank will rise, creating a risk of the tank exploding.

The second safety member is coupled to the deformation means by a third safety member intended to cooperate with the second safety member so as to maintain the second safety member in the resting position when the second safety member is subjected to a temperature below the predetermined temperature and to elastically return the second safety member back to the working position when the second safety member is subjected to a temperature higher than the predetermined temperature. This embodiment is advantageous in that it creates a threshold effect for the second safety member to move from its resting position back to its working position and therefore for the deformation means to move from their resting position to their deformation of the first safety member position. Thus, the risk of the deformation means coming into contact with the first safety member with insufficient kinetic energy to deform, for example bend or destroy, the first safety member is reduced. The reliability of the safety device is thus increased.

The invention also relates to a kit for manufacturing a safety device as described above, comprising a second safety member and a third safety member, the second safety member and the third safety member being intended to be fitted to a housing of the safety device comprising the ventilation channel, the safety piston and the first safety member of the safety device. Advantageously, such a kit makes it possible to quickly and easily implement the embodiment described above wherein the second safety member is coupled to the deformation means via the third safety member. Thus, it is possible to add the second safety member and the third safety member of this embodiment to the body of a safety device according to the invention in order to implement this embodiment when the advantages offered by this embodiment are so desired.

The invention also relates to a tank intended to contain a pressurized gas equipped with a safety device as described above. As explained above, such a tank is safer than a tank fitted with a safety device of the prior art.

A motor vehicle comprising a tank as described above is also described. The tank is typically a fuel tank, for example a dihydrogen tank.

Finally, the invention relates to a method of manufacturing a safety device as described above, wherein the following steps are implemented:

attaching the deformation means to a housing comprising the ventilation channel, the safety piston and the first safety member, and attaching the second safety member to the housing.

BRIEF DESCRIPTION OF THE FIGURES

The invention will be better understood upon reading the following description, which is provided merely as a non-limiting example and with reference to the appended drawings, wherein.

DETAILED DESCRIPTION

FIGS. 1 to 4 show two embodiments of a safety device according to the invention.

Figure 1:
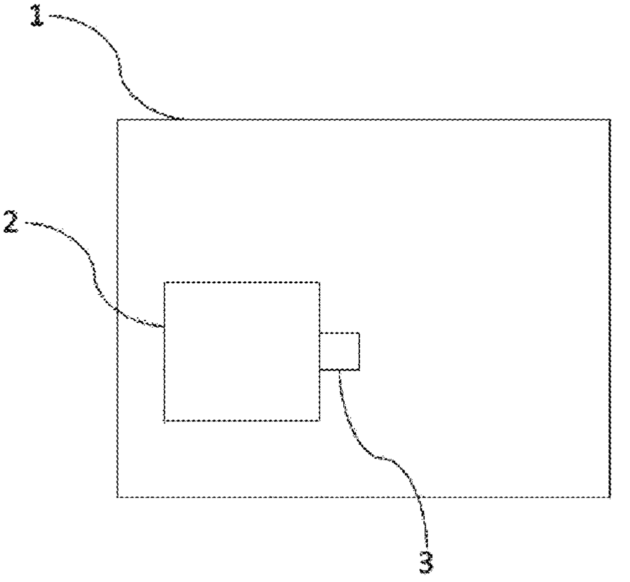
FIG. 1 is a schematic view of a motor vehicle comprising a tank fitted with a safety device according to the invention.

FIG. 1 schematically shows a motor vehicle 1 comprising a tank 2 intended to contain a pressurized gas equipped with a safety device 3 according to the invention.

In the present case, the tank 2 is intended to contain fuel for the motor vehicle 1, more specifically the tank 2 is intended to contain compressed dihydrogen, typically between 300 and 700 bar. A single safety device 3 is shown in FIG. 1. In accordance with other embodiments, the number of safety devices 3 fitted to the tank is greater, for example between two and twenty. In other embodiments, the safety device 3 can be fitted to tanks other than fuel tanks or dihydrogen tanks.

Figure 2:
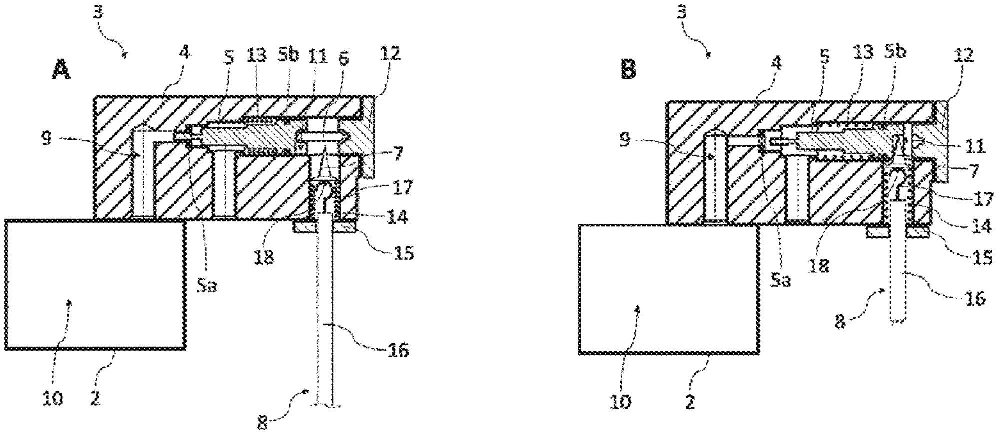
FIG. 2 is a schematic cross-sectional view of a first embodiment of the safety device according to the invention shown in the resting position (A) and in the safety position (B)

FIG. 2 shows a first embodiment of a safety device 3 according to the invention, wherein the safety device 3 is shown in its resting position (FIG. 2A) and in its safety position (FIG. 2B).

The safety device 3 comprises a body or housing 4 on which are mounted a safety piston 5, a first safety member 6, deformation means 7 and a second safety member 8.

The housing 4 comprises a ventilation channel 9 intended to fluidly connect an internal volume 10 defined by the tank 2 and the outside of the tank 2. A first end of the ventilation channel 9 opens into the internal volume 10 of the tank 2 and a second end of the ventilation channel 9 vents to the outside of the tank 2.

The safety piston 5 is slidably mounted inside the ventilation channel 9 that is movable between a closure position wherein it closes the ventilation channel 9 (FIG. 2A), and a safety position wherein it does not close the ventilation channel 9 (FIG. 2B). In other words, in the closure position, the safety piston 5 prevents fluid communication between the internal volume 10 and the outside of the tank 2. In the closure position, a seal 5*a* arranged between the safety piston 5 and an inner wall of the ventilation channel 9 cooperates with part of the safety piston 5 to prevent the gas present in the internal volume 10 from escaping through the ventilation channel 9. In the safety position, the safety piston 5 no longer closes, at least partially, the ventilation channel 9 so that the internal volume 10 of the tank 2 fluidly communicates with the outside of the tank. In the safety position, the seal 5*a* no longer cooperates with the safety piston 5 to seal the ventilation channel 9, as a result, the pressurized gas in the internal volume 10 escapes via the ventilation channel 9. The seal improves the sealing when the safety piston 5 closes the ventilation channel 9. In an alternative embodiment, the safety device 3 may not comprise a seal 5*a*. A sliding ring 5*b* mounted on the safety piston 5 guides the sliding of the safety piston 5 between the closure position and the safety position. The safety piston 5 is machined to provide a hollow housing 11.

The first safety member 6 is deformable. It is configured to keep the safety piston 5 in the closure position against an elastic force returning the safety piston 5 in the safety position. In the present case, the first safety member 6 is frangible and is formed by a glass bulb containing a fluid intended to exert pressure on the bulb so as to break it when it is subjected to a predetermined temperature. The first safety member 6 keeps the safety piston 5 in the closure position and is located between the safety piston 5 and a fixed point 12. The glass bulb is thus dimensioned to hold the safety piston 5 in the closure position until it is broken. In another embodiment, the first safety member 6 is fusible when subjected to the predetermined temperature. In this case, the predetermined temperature is between 95° C. and 150° C.

The elastic force returning the safety piston 5 back to the safety position is supported by a compression spring 13. In the closure position, the spring 13 is compressed by the safety piston 5 under the action of the first safety member 6 (FIG. 2A). In other embodiments, the elastic force returning the safety piston 5 in the safety position may be carried by a member other than a spring 13 in compression.

The deformation means 7 are intended to deform the first safety member 6. In the present case, this deformation consists in the destruction of the glass bulb. The deformation means 7 are movable between a resting position (FIG. 2A) and a position wherein the first safety member 6 is deformed (FIG. 2B), that is, in this case, a position wherein the glass bulb is destroyed (the destroyed bulb is not shown). The deformation means 7 comprise a needle-shaped striking element. The striking element is the part of the deformation means 7 that is intended to come into contact with the first safety member 6 in order to deform it, that is, to destroy it in this case. In other embodiments, the striking element is different and takes, for example, the form of a bayonet, arrow or a blade.

The housing 11 in the safety piston 5 is configured to house at least part of the deformation means 7 when the safety piston 5 is in the safety position and the deformation means 7 are in the deformation position (FIG. 2B), so that the deformation means 7 do not interfere with the passage of the safety piston 5 into the safety position.

The striking element of the deformation means 7 rests on a compression spring 14 which elastically returns the striking element in the position for deforming the first safety member 6. The spring 14 and the striking element are housed in a recess in the housing 4 of the safety device 3. This recess opens onto an external opening in the housing 4 of the safety device 3. A washer 15 is attached to the outer opening of the recess and forms a support seat for the spring 14. The washer 15 has an annular shape having a central through-hole. At least part of the opening in the washer 15 is composed of and/or covered by lubrication means. The lubrication means may be solid, liquid or paste-like. The lubrication means are for example grease, lubricating oil or a solid non-stick coating such as Teflon®.

The second safety member 8 consists of a two-meter-long safety cable 16 which corresponds approximately to the length of the tank 2. In other embodiments, the length of the safety cable 16 is different, for example between one and ten meters, preferably between one and three meters. Advantageously, the length of the safety cable 16 is selected to correspond substantially to the length of the tank 2. The safety cable 16 is made of a material with low mechanical resistance to fire. Typically, the safety cable 16 is made of a material classified D in accordance with European standard EN 13501-1, or a material classified M3 or M4 in accordance with French standard NF P92-507. For example, the safety cable 16 is made of rubber, polyamide, wool, polyester or polypropylene. In particular, the material used for the safety cable 16 is selected according to the predetermined temperature. Thus, the safety cable must break if it experiences a temperature higher than the predetermined temperature for a predetermined period of time, for example a period of time between 10 seconds and 1 hour, preferably between 1 minute and 45 minutes, even more preferably between 10 minutes and 30 minutes. Advantageously, the safety cable 16 is made of elastic material, such as rubber, in order to compensate for any changes in the dimension of the tank as said tank fills up.

The safety cable 16 is tensioned between on the one hand a static attachment point (not shown) and on the other hand means for attachment 17 to the deformation means 7. According to this first embodiment, the means 17 for attachment to the deformation means 7 are formed by a hook intended to hook onto the striking element of the deformation means 7. For this purpose, the striking element has a ring 18 sized to accommodate the hook. In other embodiments, the safety cable 16 is attached to the deformation means 7 in a different way, for example by gluing, crimping, clipping or welding.

The second safety member 8 is intended, in the resting position (FIG. 2A), to hold the deformation means 7 in the resting position against a elastic force returning the deformation means 7 back to the deformation position of the first safety member 6 when the second safety member 8 experiences a temperature lower than the predetermined temperature, and, in the working position (FIG. 2B), to release the elastic force for returning the deformation means 7 back to the deformation position of the first safety member 6 when the second safety member 8 experiences a temperature higher than the predetermined temperature.

The elastic force returning the deformation means 7 back to the deformation position is provided by the compression spring 14. Thus, in the present embodiment, the safety cable 16 is, in the resting position, tensioned so as to compress the spring 14 and to hold the deformation means in the resting position (FIG. 2A). In the working position, the safety cable 16 no longer compresses the spring 14 and thus releases the elastic force thereof for returning the deformation means 7 back to the deformation position (FIG. 2B).

The opening in the washer 15, which forms a seat for the spring 14, is configured to allow the second safety member 8, and more specifically the safety cable 16, to pass through. The movement of the safety cable 16 relative to the washer 15 is advantageously facilitated by the presence of lubrication means at the opening in the washer. Thus, the risk of friction is reduced between the safety cable 16 and the opening in the washer 15, resulting in a reduction in the kinetic energy with which the deformation means 7 reach the position for deforming the first safety member 6, such a reduction in kinetic energy being likely to prevent deformation of the first safety member 6 and thus render the safety device 3 inoperative.

An example of operation of the safety device 3 according to the first embodiment of the invention is described below.

Initially, the tank 2 is not subjected to any heat source, the safety device 3 is therefore in the resting position (FIG. 2A). Thus, the safety cable 16 is intact and holds the striking element of the deformation means 7 in the resting position against the elastic force returning the deformation means 7 back to the deformation position provided by the spring 14. The first safety member 6 is not deformed, that is, in this case the glass bulb is not broken. The first safety member 6 therefore keeps the safety piston 5 in the closure position of the ventilation channel 9. The internal volume 10 of the tank 2 is thus not fluidly connected with the outside of the tank 2.

In a second step, part of the tank 2 is subjected to a heat source having a temperature higher than the predetermined temperature. For example, in the case where the predetermined temperature is 100° C., this part of the tank is subjected to a heat source having a temperature of 110° C. This heat source is formed for example by a flame. Since the safety cable 16 extends along the entire length of the tank 2, it is subjected to the heat source regardless of the position thereof along the tank 2. As the temperature to which the safety cable 16 is subjected exceeds the predetermined temperature, the safety cable 16 is burnt and breaks, thus passing into a working position wherein it no longer keeps the striking element of the deformation means 7 in the resting position and releases the elastic return force of the spring 14 such that the striking element is propelled by the spring 14 into the deformation position. When the striking element of the deformation means 7 comes into contact with the glass bulb of the first safety member 6, it has sufficient kinetic energy, supplied by the spring 14, to shatter the glass bulb. With the bulb broken, the first safety member 6 no longer keeps the safety piston 5 in the closure position and the spring 13 moves it to the safety position. In this case, complete displacement up to the safety position is facilitated by the presence of the housing 11 in the safety piston 5, which is configured to house at least part of the striking element of the deformation means 7. When the safety piston 5 moves into the safety position, the ventilation channel 9 is released, fluidly connecting the internal volume 10 of the tank 2 with the outside of the tank 2. The gas contained in the tank 2 therefore escapes to the outside via the ventilation channel 9 thus preventing a pressure build-up inside the tank 2 that could cause said tank to explode. The safety device 3 thus provides a safer tank 2, reducing the risk of explosion in the presence of a heat source.

Figure 3:
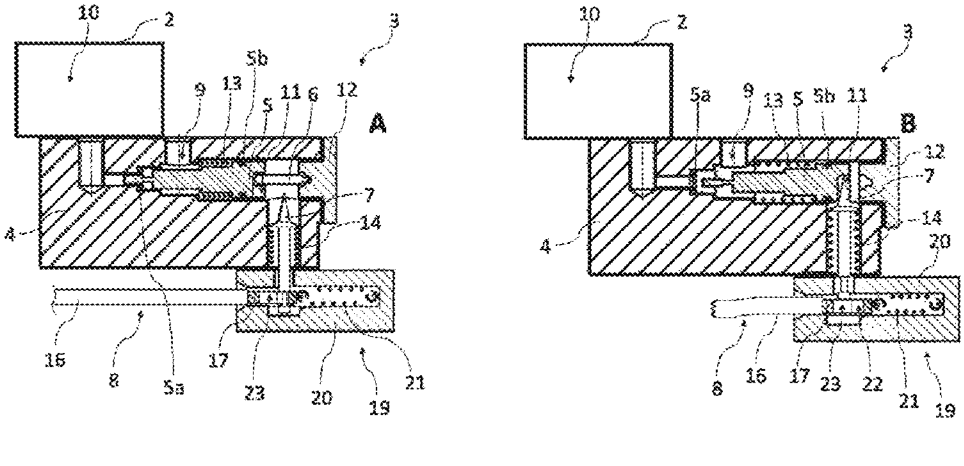
FIG. 3 is a schematic cross-sectional view of a second embodiment of the safety device according to the invention shown in the resting position (A) and in the safety position (B).
Figure 4:
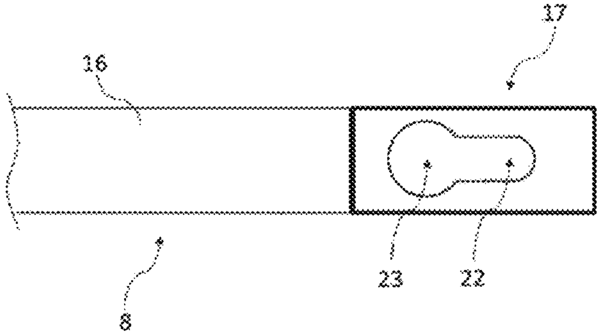
FIG. 4 is a schematic top view of the means for attaching the second safety member to the deformation means according to the second embodiment.

With reference to FIGS. 3 to 4, a second embodiment of the invention is described below.

For this second embodiment, the same numerical references are used for the counterparts of the first embodiment.

The differences with respect to the first embodiment will be described hereinafter. For identical elements, please refer to the description thereof given above for the first embodiment.

In the second embodiment, the safety device 3 comprises a third safety member 19 intended to cooperate with the second safety member 8 in such a way as to hold the second safety member 8 in the resting position (FIG. 3A) when the second safety member 8 experiences a temperature lower than the predetermined temperature and to elastically return the second safety member 8 back to the working position (FIG. 3B) when the second safety member 8 experiences a temperature higher than the predetermined temperature.

The third safety member 19 comprises a body 20 and a tension spring 21. The body 20 has the shape of a hollow box. It is attached to the housing 4 of the safety device 3 at the external opening in the recess comprising the striking element and the spring 14. In the second embodiment, the body 20 fulfills the function of a support seat for the spring 14, which is fulfilled by the washer 15 in the first embodiment. The tension spring 21 is housed inside the body 20 and is attached on the one hand to an internal wall of the body 20 and on the other hand to the means 17 for attaching the second safety member 8 to the deformation means 7. The spring 21 provides the elastic force for returning the second safety member 8 back to the working position.

The means 17 for attaching the second safety member 8 to the deformation means 7 are different from those of the first embodiment. In place of the hook, they comprise a connecting member comprising two openings following one another along the connecting member, the two openings being in communication. The first opening, known as the rest opening 22, is narrower than the second opening, known as the work opening 23 ([FIG. 4]).

The striking element of the deformation means 7 is slightly different to that of the first embodiment. It comprises an elongated connecting end with the connecting member and has a reduced-diameter portion able to be housed in the rest opening 22. The striking element is dimensioned so as not to be movable in translation along the longitudinal direction thereof when the reduced portion thereof is housed in the rest opening 22. The striking element is further dimensioned to be movable in translation along the longitudinal direction thereof when the reduced portion thereof is housed in the work opening 23.

In the resting position, the safety cable 16 is tensioned between its fixed end and its end connected to the means 17 for attachment to the deformation means 7. The third safety member 19 is configured so that the rest tension of the safety cable 16 and the elastic force for returning the second safety member 8 back to the working position provided by the tension spring 21 cooperate in order to hold the second safety member 8 in the resting position. In this position, the reduced portion of the striking element is housed in the rest opening 22 such that the second safety member 8 holds the striking element in the resting position preventing its longitudinal translation and compressing the compression spring 14.

An example of operation of the safety device 3 according to the second embodiment of the invention is described below.

Initially, the tank 2 is not subjected to any heat source, the safety device 3 is therefore in the resting position (FIG. 3A). The safety cable 16 is intact and holds the striking element of the deformation means 7 in the resting position against the elastic force returning the deformation means 7 back to the deformation position provided by the spring 14. This holding is achieved because the striking element is housed in the rest opening 22 and is therefore not movable in translation along the longitudinal direction thereof. The first safety member 6 is not deformed, that is, in this case the glass bulb is not broken. The first safety member 6 therefore keeps the safety piston 5 in the closure position of the ventilation channel 9. The internal volume 10 of the tank 2 is thus not fluidly connected with the outside of the tank 2.

In a second step, the tank 2 is subjected to a heat source having a temperature higher than the predetermined temperature. For example, in the case where the predetermined temperature is 100° C., the tank is subjected to a heat source having a temperature of 110° C. This heat source is formed for example by a flame. Since the safety cable 16 extends along the entire length of the tank 2, it is subjected to the heat source regardless of the position thereof along the tank 2. If the temperature to which the safety cable 16 is subjected exceeds the predetermined temperature, the safety cable 16 burns and breaks. As a result, the tension of the safety cable 16 no longer allows it to be held in the resting position and the tension spring 21 elastically returns the second safety member 8 back to its working position. During this transition to the working position, the reduced portion of the striking element which was previously housed in the rest opening 22, is now housed in the work opening 23, due to the displacement of the connecting member attached to the safety cable 16. Longitudinal translation of the striking element is then permitted as the second safety member 8 no longer holds it in the resting position and releases the elastic return force of the spring 14 so that the striking element is propelled by the spring 14 into the deformation position. When the striking element of the deformation means 7 comes into contact with the glass bulb of the first safety member 6, it has sufficient kinetic energy, supplied by the spring 14, to shatter the glass bulb. With the bulb broken, the first safety member 6 no longer keeps the safety piston 5 in the closure position and the spring 13 moves it to the safety position. In this case, complete displacement up to the safety position is facilitated by the presence of the housing 11 in the safety piston 5, which is configured to house at least part of the striking element of the deformation means 7. When the safety piston 5 moves into the safety position, the ventilation channel 9 is released, fluidly connecting the internal volume 10 of the tank 2 with the outside of the tank 2. The gas contained in the tank 2 therefore escapes to the outside via the ventilation channel 9 thus preventing a pressure build-up inside the tank 2 that could cause said tank to explode. The safety device 3 thus provides a safer tank 2, reducing the risk of explosion in the presence of a heat source. It should also be noted that the third safety member creates a threshold effect for triggering the deformation means 7. Slight variations in the length of the safety cable 16, for example due to its elasticity and different filling conditions of the tank 2 or even due to creep or loosening of the material of the safety cable 16 under the action of heat or time (aging), will not allow the displacement of the striking element as its reduced portion will always be housed in the rest opening 22 which does not allow longitudinal translation of the striking element. Thus, when the second safety member 8 moves into the working position, the elastic reserve of the spring 14 will not have been depleted and the kinetic energy of the striking element when it reaches the first safety member 6 will be at its maximum. This thus reduces the risk of the safety device 3 failing to switch to the safety position when the second safety element 8 has been subjected to a temperature higher than the predetermined temperature.

The invention is not limited to the embodiments presented, and other embodiments will become clearly apparent to the person skilled in the art.

LIST OF REFERENCES

1: motor vehicle
2: tank
3: safety device
4: housing
5: safety piston
5*a*: seal
5*b*: sliding ring
6: first safety member
7: deformation means
8: second safety member
9: ventilation channel
10: internal volume of the tank
11: housing in the safety piston
12: fixed point for the first safety member
13: compression spring
14: compression spring
15: washer
16: safety cable
17: means for attaching the second safety member to the deformation means
18: ring
19: third safety member
20: body of third safety member
21: tension spring
22: rest opening of the connecting member
23: work opening of the connecting member

The invention claimed is:

1. A safety device for a tank configured to contain a pressurized gas, comprising:

a ventilation channel configured to establish fluid communication between an internal volume defined by the tank and an outside of the tank;

a safety piston movable between a closure position in which the safety piston closes the ventilation channel, and a safety position in which the safety piston does not close the ventilation channel;

a first safety member which is deformable and configured to hold the safety piston in the closure position against an elastic return force returning the safety piston in the safety position;

deformation means for deforming the first safety member, wherein the deformation means are movable between a resting position and a deformation of the first safety member position, and at least a second safety member configured, in a resting position, to hold the deformation means in the resting position against an elastic force returning the deformation means in the deformation of the first safety member position when the second safety member is subjected to a temperature below a predetermined temperature and, in a working position, to release the elastic force returning the deformation means in the deformation of the first safety member position when the second safety member is subjected to an other temperature higher than the predetermined temperature, wherein the second safety member is formed by a safety cable made of a material having a mechanical resistance to fire of between 10 seconds and 1 hour, wherein the safety piston comprises a housing configured to house at least part of the deformation means when the safety piston is in the safety position and the deformation means are in the deformation of the first safety member position.

2. The safety device according to claim 1, wherein the first safety member is formed by a glass bulb containing a fluid, the fluid being configured to exert pressure on the bulb when subjected to the other temperature above the predetermined temperature so as to break the bulb.

3. The safety device according to claim 1, wherein the elastic force returning the deformation means in the deformation of the first safety member position is provided by a spring resting on a support seat having an opening configured to allow the passage of the second safety member.

4. The safety device according to claim 1, wherein the deformation means comprise a striking element.

5. The safety device according to claim 1, wherein the second safety member comprises an elastic member.

6. The safety device according to claim 1, wherein the material of the safety cable is classified D according to the 2018 version of the European standard EN 13501-1 or is classified M3 or M4 according to the 2004 version of the French standard NF P92-507.

7. The safety device according to claim 1, wherein the material of the safety cable is selected from the group consisting of rubbers, polyamides, wools, polyesters, high-density polyethylenes, polypropylenes, and combinations thereof.

8. The safety device according to claim 7, wherein the safety cable is made of polypropylene.

9. The safety device according to claim 1, wherein the mechanical resistance to fire of the material of the safety cable is between 1 minute and 45 minutes.

10. The safety device according to claim 1, wherein the second safety member is coupled to the deformation means by a third safety member configured to cooperate with the second safety member so as to hold the second safety member in the resting position when the second safety member is subjected to a temperature below the predetermined temperature and to elastically return the second safety member to the working position when the second safety member is subjected to a temperature higher than the predetermined temperature.

11. A tank for containing a pressurized gas, comprising the safety device according to claim 1.

12. A method of manufacturing the safety device according to claim 1, wherein the following steps are carried out:

attaching the deformation means to a housing comprising the ventilation channel, the safety piston, and the first safety member, and attaching the second safety member to the housing.

13. The safety device according to claim 1, wherein the mechanical resistance to fire of the material of the safety cable is between 10 minutes and 30 minutes.

* * * * *